(12) United States Patent
Stouffer

(10) Patent No.: US 6,595,350 B1
(45) Date of Patent: Jul. 22, 2003

(54) BLADDER CONVEYOR SYSTEMS AND METHOD

(75) Inventor: Ronald D. Stouffer, Silver Spring, MD (US)

(73) Assignee: Bowles Fluidics Corporation, Columbia, MD (US)

( * ) Notice: Subject to any disclaimer, the term of this patent is extended or adjusted under 35 U.S.C. 154(b) by 0 days.

(21) Appl. No.: 09/774,884

(22) Filed: Feb. 1, 2001

Related U.S. Application Data
(60) Provisional application No. 60/180,122, filed on Feb. 3, 2000.

(51) Int. Cl.[7] .............................................. B65G 35/00
(52) U.S. Cl. ......................................... 198/630; 406/94
(58) Field of Search ..................... 198/630; 406/14, 406/16, 17, 19, 85, 94, 95, 192, 198

(56) References Cited

U.S. PATENT DOCUMENTS

| | | | | |
|---|---|---|---|---|
| 2,856,139 A | * | 10/1958 | Lockwood | 244/63 |
| 3,327,832 A | * | 6/1967 | Kyle | 198/1 |
| 3,687,083 A | * | 8/1972 | Brown | 104/155 |
| 3,693,740 A | * | 9/1972 | Lewis et al. | 180/8 R |
| 3,785,295 A | * | 1/1974 | Kiukkonen | 104/155 |
| 3,848,538 A | * | 11/1974 | Hondzinski | 104/155 |
| 3,848,539 A | * | 11/1974 | Hondzinski | 104/155 |
| 3,985,064 A | * | 10/1976 | Johnson | 91/413 |
| 4,227,608 A | * | 10/1980 | Alfthan et al. | 198/630 |
| 5,109,832 A | | 5/1992 | Proctor et al. | 128/24 R |

* cited by examiner

*Primary Examiner*—Christopher P. Ellis
*Assistant Examiner*—Rashmi Sharma
(74) *Attorney, Agent, or Firm*—Jim Zegeer

(57) ABSTRACT

Conveying systems and methods in which a series of inflatable bladders are inflated and deflated in such a way as to convey objects in given directions.

7 Claims, 3 Drawing Sheets epitrochoidal wave

BLADDER CONVEYOR SYSTEMS AND METHOD

REFERENCE TO RELATED APPLICATION

The present application is the subject of provisional application Serial No. 60/180,122 filed Feb. 3, 2000 entitled BLADDER CONVEYOR.

BACKGROUND AND BRIEF DESCRIPTION OF THE INVENTION

The present invention relates to conveying systems and methods in which a series of inflatable bladders are inflated and deflated in such a way as to convey objects in given directions.

There is a need for multi-celled air pads/mattresses (mat) which can be configured to be capable of conveying themselves relative to the supporting surface or alternatively conveying resting objects to move relative to the mat.

In this invention, there are two general conveying principles that apply, one to convey objects smaller than a wave length of a bladder array and the other for larger-than-wavelength objects. However, both involve the sequential inflation and deflation of adjacent air cells in a wave pattern.

In a first embodiment of the invention a conveyor or transporter is provided for moving an object smaller than a predetermined dimension in a given direction. A plurality of elongated, inflatable bladder elements in parallel array, each bladder element has an elongated axis which is transverse to the given direction, there being an X group of the bladder elements connected to a first source of air, a Y group of the bladder elements to a second source of air, and a Z group of the bladder elements connected to a third source of air. A control unit for pulsing the first, second and third sources of air to thereby sequentially and rhythmically inflate and deflate the X, Y and Z groups of bladder elements to thereby move the object in the given direction.

In a second embodiment of the invention a conveyor or transporter is provided for moving an object larger than a predetermined dimension in a given direction. A plurality of elongated, inflatable bladder elements in parallel array, each bladder element has an elongated axis which is transverse to the given direction, there being an X group of the bladder elements connected to a first source of air, a Y group of the bladder elements connected to a second source of air, and a Z group of the bladder elements connected to a third source of air. A flexible member joined to each of the bladder forms an object conveying surface, and a control unit for pulsing the first, second and third sources of air to thereby sequentially and rhythmically inflate the X, Y and Z groups of bladder elements to epitroichardly raise and lower points on the object conveying surface and move the object in the given direction.

Thus, the object of the invention is to provide bladder conveyor systems and methods for moving objects smaller and/or larger than predetermined dimensions related to the wavelength of the spacing between the bladder elements.

BRIEF DESCRIPTION OF THE DRAWINGS

The above and other objections, advantages and features of the invention will become more apparent when considered with the following specification and accompanying drawings wherein.

DETAILED DESCRIPTION OF THE INVENTION

Conveying Smaller-Than-Wavelength Objects

Figure 1:
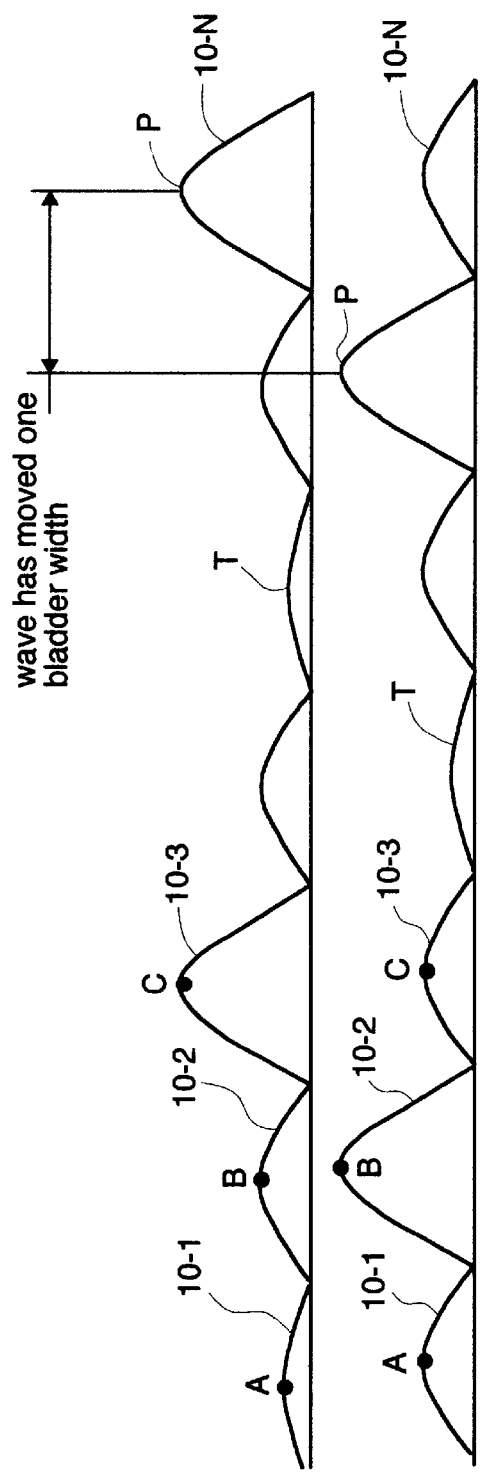
FIGS. 1A shows the movement of a locus of a single point on a bladder.
FIGS. 1B and 1C show the wave at two different times and is progressive to the left.

Referring to FIGS. 1A, 1B and 1C, the first embodiment involves stand-alone bladders 10-1, 10-2, 10-3 . . . 10-N which are not physically interconnected. As they are caused to sequentially inflate and deflate, a point on the bladder 10 will rise and fall in a vertical straight line as shown in FIG. 1A.

In FIGS. 1B and 1C, the wave is shown at two different times and is progressing to the left. During the time between FIG. 1B and FIG. 1C, the wave has progressed one bladder width. The peaks P and troughs T have moved and therefore could convey objects smaller than a wave length, say liquid or small objects, i.e. stones, sand, balls, etc. But it would not convey a plank, for instance, that was greater in length than a wave length and placed lengthwise across two peaks P. The reason the plank would not convey is that the points of the bladder touching the plank rise and fall in a vertical line, i.e., no motion is imparted to the plank in a lengthwise (horizontal) direction.

Conveying Larger-Than-Wavelength Objects

Figure 2:
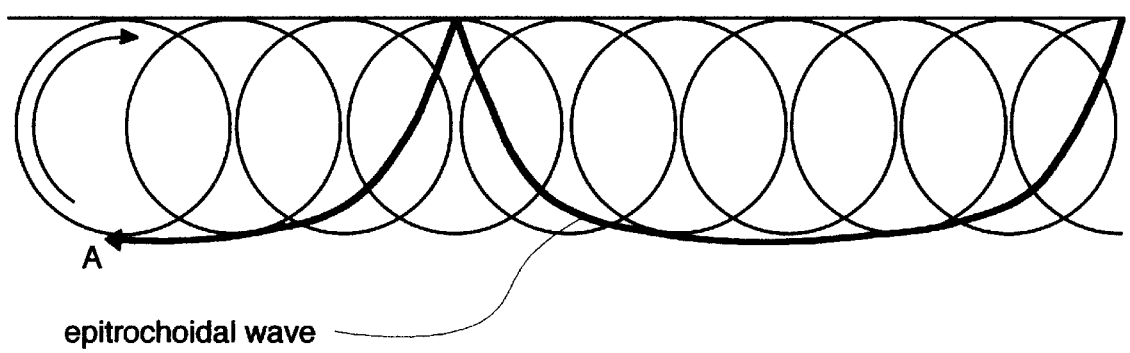
FIG. 2 is a visualization of the path described by a point on the circumference of a circle as it rolls along a line.

Perhaps the most familiar but the more complicated principle is the epitrochoidal wave commonly seen as ocean waves. This familiar wave form can be more technically visualized as the path inscribed by a point A on the circumference of a circle as it rolls along a line as shown in FIG. 2.

This circular motion of any given point A on the line can be observed if one carefully watches a floating object's path as the ocean wave passes.

Figure 3:
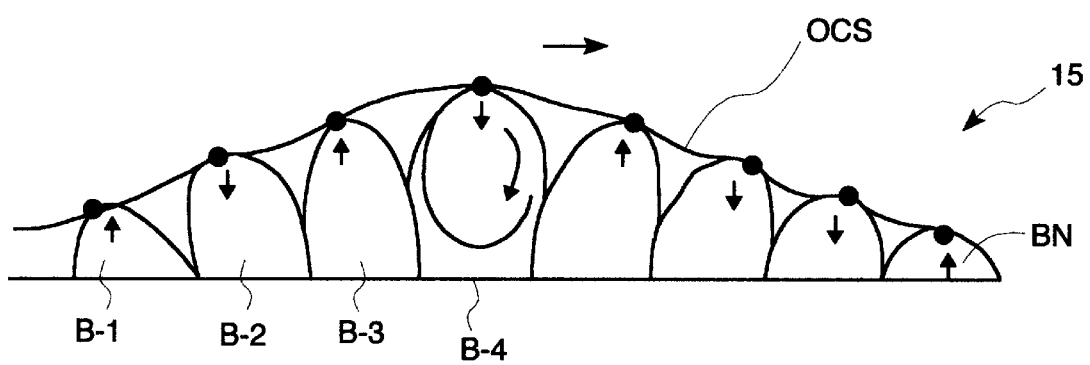
FIG. 3 shows the wave can be generated by the sequential inflating and deflating of an array of fluid air bladders comprising a mat if the bladders are properly interconnected.

As shown in FIG. 3, this epitrochoidal wave can be generated by the sequential inflating and deflating of an array of air bladders B1, B2, B3, B4, B5 . . . BN comprising a mat 15 if the bladders are properly interconnected by a flexible member FM preferably connected to the bladders and having an object conveying surface OCS.

Consider a segment of the mat 15 having a wavelength's worth of bladders N (eight in the illustrated example of FIG. 3) proportionally inflated to create the wave shape shown in FIG. 3. A cover (conveying surface OCS) is attached to the tops of the bladders B1, B2, B3 . . . BN. Then, as indicated by the arrows, consider the individual bladders to be inflating or deflating so as to cause the wave to progress to the right. Each of the individual points to which the top cover OCS is attached courses through a circular (or elliptical) path as the wave goes through. This approximately circular motion will impart, through friction, motion to an object situated on top of the mat FM (shown as a locus of points at the center bladder).

Figure 4:
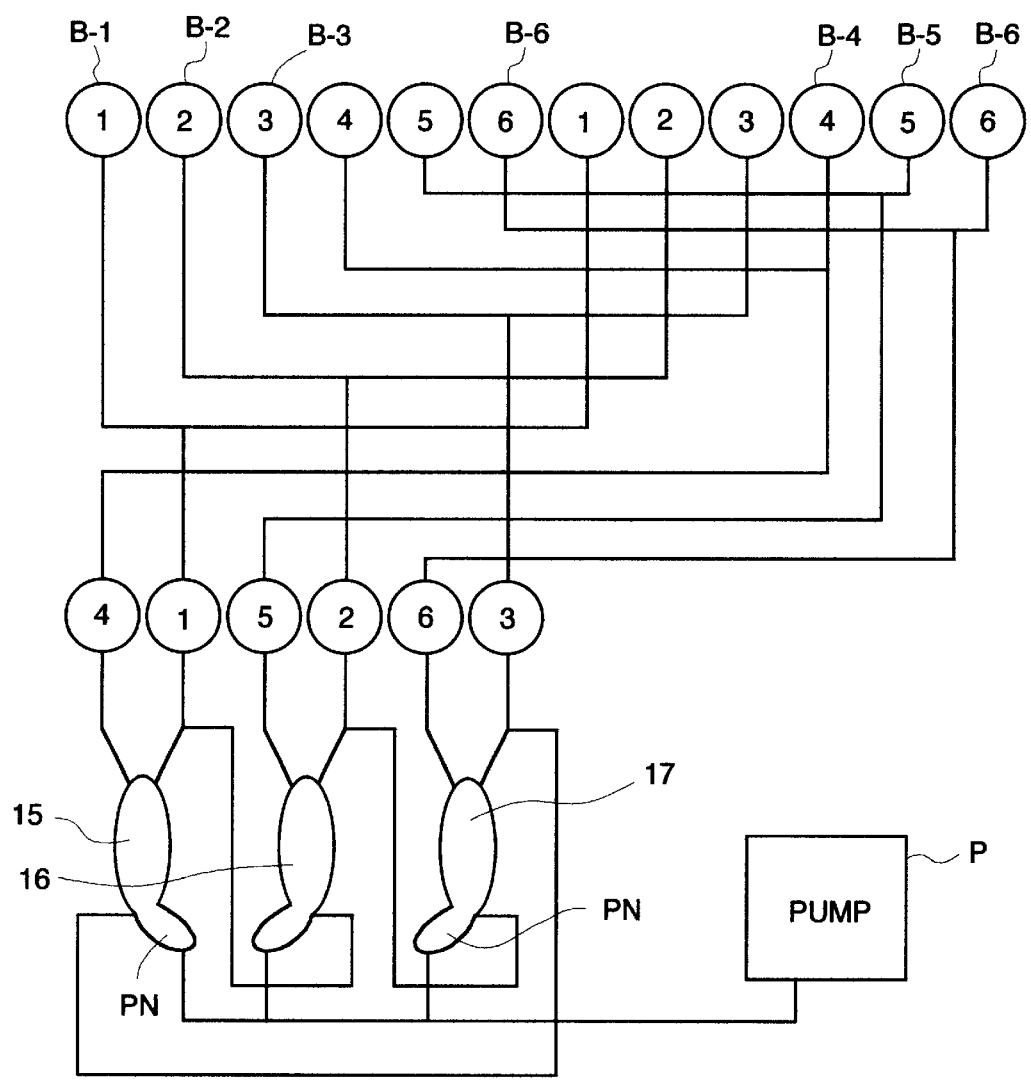
FIG. 4 is a schematic illustration of a fluidic circuit used for inflating the bladders in a given sequence.

A fluidic method may be used to provide the control and appropriate switching of the air to the bladders to provide the wave motion. Such a fluidic circuit is shown in FIG. 4.

The fluidic switches 15, 16, 17 are NOR elements to minimize the required plumbing. The preferential side is accomplished by skewing the power nozzle PN, which are supplied with fluidic under pressure from a pump P. The switching sequence is numbered 1 through 6 (e.g. the circled number in the output lines) at the elements and correspond to the hookup to the bladders. The sequencing is caused by the output of switch 15 being connected to a control port on switch 16; an output of switch 16 is connected to a control port of switch 17; and, an output of switch 17 is connected to a control port on switch 15.

The fluidic switch elements 15, 16, 17 have vented output receivers (not shown). Other fluidic circuits could be used but this one is preferred because of the minimal connections required.

It will be appreciated that a system of mechanical valves can be used to sequentially inflate and deflate the bladders in place of the fluidic elements.

More on the uses of the conveying bladder of the epitrochoidal type: Since the orbital motion of surface points is present with this type of conveyor, there are many possible modes of usage. In addition to conveying objects smaller than one wavelength, the mat is capable of conveying itself with respect to its supporting surface, a feature that could be used to position the mat into hard-to-reach places such as to move under a refrigerator, for instance. Then the mat could be further inflated so as to lift the refrigerator, and a second mode activated to convey the refrigerator relative to the mat if the mat were secured to the floor—or convey the mat and refrigerator relative to the floor if the mat were attached to the refrigerator.

In a patient-care situation, the new capability could be used to move that mat onto a bed. If the mat is secured to the bed it can be used to transport the patient without any other help. Or if the patient were held and the mat secured to the bed, the bed clothing could be conveyed from under the patient without resorting to the normal double roll of the patient.

While the invention has been described in relation to preferred embodiments of the invention, it will be appreciated that other embodiments, adaptations and modifications of the invention will be apparent to those skilled in the art.

What is claimed is:

1. A transporter for moving an object in a given direction, comprising:
   - a plurality of elongated, inflatable bladder elements in parallel array, each bladder element having an elongated axis which is transverse to said given direction, there being an X group of said bladder elements connected to a first source of air, a Y group of said bladder elements connected to a second source of air, and a Z group of said bladder elements connected to a third source of air, and
   - a flexible member joined to each said bladder and forming an object conveying surface, and
   - a control unit for pulsing said first, second and third sources of air to thereby sequentially and rhythmically inflate said X, Y and Z groups of bladder elements to raise and lower points and move said object in said given direction relative to said object conveying surface.

2. A transporter for moving an object in a given direction as defined in claim 1 wherein said control unit is a plurality of fluidic switches connected to sequentially inflate and deflate said bladder elements.

3. A transporter for moving an object in a given direction,
   - a plurality of elongated, inflatable bladder elements in parallel array, each bladder element having an elongated axis which is transverse to said given direction, there being an X group of said bladder elements connected to a first source of air, a Y group of said bladder elements connected to a second source of air, and a Z group of said bladder elements connected to a third source of air,
   - a flexible member joined to each said bladder and forming an object conveying surface, and
   - a control unit for pulsing said first, second and third sources of air to thereby sequentially and rhythmically inflate said X, Y and Z groups of bladder elements of epitroichardly raise and lower points on said object conveying surface and move said object in said given direction relative to said object conveying surface.

4. A transporter for moving an object in a given direction as defined in claim 3 wherein said control unit is constituted by a plurality of no-moving part fluidic switches.

5. A method of conveying objects along a path comprising defining said path by an array of elongated inflatable/deflatable bladder elements, providing a flexible member joined to the bladder elements forming an object conveying surface and cyclically inflating and deflating said bladder elements so as to cause an elongated object on said surface to be conveyed in a given selected direction.

6. The method defined in claim 5 wherein said inflation and deflation of said bladder elements effects approximately circular motion to cause, through friction, objects to move in said given selected direction.

7. A bladder conveyor system comprising an array of elongated bladder elements arranged in groups, each group constituting a given wavelength,
   - a flexible member joined to the bladder elements and forming an object conveying surface and means for inflating and deflating said sets of bladder elements so as to cause an elongated object having a length at least as great as said wavelength on said surface to be conveyed in a given direction.

* * * * *